United States Patent Office 3,475,325
Patented Oct. 28, 1969

3,475,325
HYDROCRACKING PROCESS AND CATALYST
Elliott P. Doane, Bartlesville, Okla., assignor to Phillips Petroleum Company, a corporation of Delaware
No Drawing. Filed Sept. 26, 1966, Ser. No. 581,728
Int. Cl. C10g *11/06;* B01j *11/74*
U.S. Cl. 208—111                                    6 Claims

ABSTRACT OF THE DISCLOSURE

Increased hydroisomerization and hydrocracking activity of sulfided nickel-tungsten-boria-alumina or nickel-molybdenum-silica-alumina is achieved by the addition of neodymium to the system.

---

This invention relates to the catalytic conversion of hydrocarbons and more particularly to the catalytic hydrocracking of high boiling hydrocarbons to those of lower boiling range in the presence of new and improved catalysts.

Hydrocracking processes are commonly employed on heavy residual or distillate oils for the production of substantial yields of low boiling saturated products, such as gasoline, intermediate distillates which may be utilized as domestic fuels and, to some extent, heavier cuts suitable for use as lubricants. In these hydrocracking processes, cracking and hydrogenation reactions take place simultaneously. Hydrocracking, as distinguished from simple hydrogenation wherein only the addition of hydrogen to unsaturated bonds takes place, is cracking under hydrogenating conditions so that products of the cracking reaction are substantially more saturated than when hydrogen or materials supplying hydrogen are not present. While many catalyst systems are known for use in hydrocracking processes, there is still room for improvement as to the degree of activity, effective life, efficiency, per-pass conversion rate, conversion temperature, stability to regeneration, and the like.

In the hydrocracking of materials such as the normal aliphatic hydrocarbons with sulfided nickel-tungsten or nickel-molybdenum, it is desirable to maximize the yield of highly branched product. This product, under the conditions used in hydrocracking, will be mostly saturated. The hydrocracking process thus simultaneously effects hydroisomerization to branched structures. As in hydrocracking, there is still room for improvement in hydroisomerizing activity of the catalysts of commerce.

While catalytic hydrocracking and hydroisomerization are well known in the art, these processes are generally carried out at high temperature conditions. The present invention provides a novel system whereby results previously obtained only at higher temperatures are achieved at lower temperature conditions, thus indicating higher activity.

In addition to providing a more active system whereby lower operating temperatures are employed, there is further achieved through the use of this invention higher branched-chain hydrocarbon to straight-chain hydrocarbon ratios in the hydrocracked product, thus indicating increased hydroisomerization activity.

Thus, it is an object of the present invention to provide an improved process for the hydrocracking of high boiling hydrocarbons whereby there is obtained increased hydroisomerization and hydrocracking activity.

Another object of this invention is to provide a novel catalyst system for the catalytic conversion of hydrocarbons.

Other aspects, objects, and the several advantages of this invention will be apparent to one skilled in the art upon consideration of the accompanying disclosure.

In accordance with the present invention, I have discovered that by the addition of neodymium to either sulfided nickel-tungsten-boria-alumina or nickel-molybdenum-silica-alumina there is obtained a novel catalyst system which, when employed for hydrocracking and hydroisomerization results in not only a more active system as reflected by the lower temperature required for the operation but, in addition, provides higher branched-chain hydrocarbon to straight-chain hydrocarbon ratios in the hydrocracked product.

Sulfided nickel-tungsten or nickel-molybdenum catalyst on acidic supports for hydroisomerization and hydrocracking are well known in the industry.

The neodymium containing systems are prepared by admixing solutions of the active components and impregnating the support therewith. The active ingredients can be added together or in any desired sequence. The nickel, tungsten and molybdenum contents of the finished catalysts are in the range of 1 to 15 weight percent, and the neodymium content is in the range of 1 to 10 weight percent. In one mode of preparation, the boria-alumina or silica-alumina support is impregnated with aqueous solutions of the nitrates (molybdate in the case of molybdenum) of the active ingredients to give a finished catalyst containing the promoter elements. The catalyst is then dried, presulfided and thereafter employed in the hydrocracking process.

The term "hydrocracking" as used herein is cracking under hydrogenating conditions over a suitable catalyst.

The term "hydroisomerization" as used herein is broadly covered by the term "hydrocracking" and is the conversion in the presence of hydrogen of unbranched or lightly branched hydrocarbons into branched or more highly branched hydrocarbons having either the same number or fewer carbon atoms.

The hydrocracking conditions employed herein involve passing the vaporized hydrocarbons over the finished catalyst at temperatures ranging between about 450 and 950° F., preferably between 475 and 850° F., pressures above about 100 p.s.i.g., preferably between about 500 and 5000 p.s.i.g., and liquid hourly space velocities (LHSV) ranging between about 0.1 and 10.0. The preferred hydrogen ratios may range between about 1000 and 20,000 s.c.f. (32° F., 15 p.s.i.a.) per barrel of feed.

The following specific examples are intended to illustrate the invention an dare not to be interpreted as unduly limiting the same.

EXAMPLE I

Several catalysts were tested for hydrocracking-hydroisomerizing activity with n-hexadecane feed containing 0.5 weight percent sulfur as carbon disulfide under the following conditions:

Feed, LHSV _____ 0.5.
Pressure, p.s.i.g. ____ 2000.
$H_2$/Hyc, s.c.f./bbl. __ 16,000.
Temperature, ° F. ___ That required to obtain 15 weight percent $C_1$–$C_{14}$ hydrocarbons in the total product.

Catalyst preparation

Four supports were used:

(1) 4.9 boria-95.1 eta-alumina: Eta-alumina in the form of 1/16 extrudate was impregnated with sufficient boric acid to give the indicated concentration of boria, and calcined.
(2) 7.1 boria-92.9 eta-alumina: Same as support No. 1, but higher final boria content.
(3) 6.8 boria-93.2 eta-alumina: Same as support No. 1, but higher final boria content.
(4) 88 silica-12 alumina: A commercial silica-alumina ground to 10–20 mesh.

The supports were impregnated with aqueous solutions of the nitrates (molybdate in the case of molybdenum) of the active ingredients to give finished catalysts containing the indicated amounts of the promoter elements calculated as the metal. The catalysts were dried in air at 300° F. until there was no visible condensation of water in the exit line and then for two additional hours, heated to 1000° F. over a 4-hour period, and held at 1000° F. for 3 hours. The catalysts were presulfided with 3 volume percent carbon disulfide in n-hexane using the following scheme: (1) Heating the catalyst to 600° F. in a stream of nitrogen, (2) pressuring to 200 p.s.i.g. with hydrogen, (3) continuing hydrogen flow for 2 hours, (4) feeding the $CS_2$-n-$C_6$ mixture for 4 hours at 2 LHSV, and (5) starting the n-hexadecane feed, which contained 0.5 weight percent sulfur at $CS_2$.

The following results were obtained:

| Run No.: | Promoter, wt. percent of catalyst, as metal | Support | Temp., °F. | $iC_8/nC_8$ ratio |
|---|---|---|---|---|
| 1 | 2.9 Ni–11.7 W | 4.9 $B_2O_3$–95.1 Eta·$Al_2O_3$ | 700 | 1.2 |
| 2 | 5.6 Nd | 7.1 $B_2O_3$–92.9 Eta·$Al_2O_3$ | 765 | 0.8 |
| 3 | 2.4 Ni–10.5 W–2.6 Nd | 4.9 $B_2O_3$–95.1 Eta·$Al_2O_3$ | 570 | 5.0 |
| 4 | 2.2 Ni–8.3 W–6.0 Nd | 7.1 $B_2O_3$–92.9 Eta·$Al_2O_3$ | 570 | 5.0 |
| 5 | 2.6 Ni–6.9 W–2.2 Ce | 7.1 $B_2O_3$–92.9 Eta·$Al_2O_3$ | 695 | 1.9 |
| 6 | 2.1 Ni–9.2 W–3.5 Pr | 7.1 $B_2O_3$–92.9 Eta·$Al_2O_3$ | 720 | 1.3 |
| 7 | 2.6 Ni–11.5 W–1.0 Sm | 4.9 $B_2O_3$–95.1 Eta·$Al_2O_3$ | 755 | 0.5 |
| 8 | 2.3 Ni–10.1 W–3.5 La | 4.9 $B_2O_3$–95.1 Eta·$Al_2O_3$ | 755 | ~0 |
| 9 | 1.9 Ni–7.1 Mo | 6.8 $B_2O_3$–93.2 Eta·$Al_2O_3$ | 698 | 1.8 |
| 10 | 1.9 Ni–7.1 Mo–4.6 Nd | 6.8 $E_2O_3$–93.2 Eta·$Al_2O_3$ | 782 | 0.4 |
| 11 | 4.1 Ni–11.9 W | 88 $SiO_2$–12 $Al_2O_3$ | 570 | 3.2 |
| 12 | 4.1 Ni–11.9 W–4.4 Nd | 88 $SiO_2$–12 $Al_2O_3$ | 608 | 3.8 |
| 13 | 3.5 Ni–7.7 Mo | 88 $SiO_2$–12 $Al_2O_3$ | 645 | 3.2 |
| 14 | 2.8 Ni–3.5 Mo–4.5 Nd | 88 $SiO_2$–12 $Al_2O_3$ | 477 | 4.5 |

In these tests, the higher the temperature required for a 15 weight percent yield of $C_1$–$C_{14}$ hydrocarbons, the lower the hydrocracking activity, and the lower the iso$C_8$/n$C_8$ ratio, the lower the hydroisomerizing activity.

The above results indicate the following:

(1) Neodynmium oxide is not an active catalytic material (run 2).

(2) Addition of neolymium oxide to nickel-tungsten-boria-alumina results in both an increase in cracking activity and an increase in isomerizing activity (runs 3 and 4 versus run 1).

(3) Addition of other rare earth oxides to nickel-tungsten-boria-alumina does not result in an increase in either cracking activity or isomerizing activity (runs 5–8 versus run 1).

(4) Addition of neodymium oxide to nickel-molybdenum-boria-alumina does not result in an increase in either cracking activity or isomerizing activity (run 10 versus run 9).

(5) Addition of neodymium oxide to nickel-tungsten-silica-alumina does not result in an increase in cracking activity and results in only a very small increase in isomerizing activity (run 12 versus run 11).

(6) Addition of neodymium oxide to nickel-molybdenum-silica-alumina results in both an increase in cracking activity and an increase in isomerizing activity (run 14 versus run 13).

EXAMPLE II

A catalyst was prepared in the manner of Example I by adding neodymium nitrate, ammonium molybdate, and nickel nitrate to commercial silica-alumina support No. 4. The calcined catalyst contained 2.3 weight precent Ni, 4.8 percent Mo, and 3.8 percent Nd. This sulfided catalyst gave the following results in hydrocracking hydrotreated heavy cycle oil containing <1 p.p.m. nitrogen:

Temp., ° F. _____ 630
Press., p.s.i.g. _____ 1500
LHSV _____ 1.0
$H_2$/oil s.c.f./bbl. _____ 5400
Conv. to gasoline and lighter, wt. percent _____ 48.5
Gasoline yield, wt. percent _____ 45.0

The results as shown indicate addition of neodymium to the system resulting in the production of a catalyst active for the hydrocracking of a commercial hydrocracking feedstock.

Certain modifications of the invention will become apparent to those skilled in the art and the illustrative details disclosed are not to be construed as imposing unnecessary limitations on the invention.

I claim:

1. A catalyst composition selected from the group consisting of (a) sulfided neodymium-nickel-tungsten-boria-alumina and (b) sulfided neodymium-nickel-molybdenum-silica-alumina wherein said neodymium is present in an amount in the range of about 1 to 10 weight percent, said composition (a) being formed by the sulfiding of a previously calcined mixture of salts of neodymium, nickel and tungsten deposited on a boria-alumina support, and said composition (b) being formed by the sulfiding of a previously calcined mixture of salts of neodymium, nickel and molybdenum deposited on a silica-alumina support.

2. A catalyst according to claim 1 consisting essentially of sulfided neodymium-nickel-tungsten-boria-alumina.

3. A catalyst according to claim 1 consisting essentially of sulfided neodymium - nickel - molybdenum - silica-alumina.

4. In a process for hydrocracking a hydrocarbon feed in a hydrocracking zone under hydrocracking conditions, the improvement which comprises utilizing as a hydrocracking catalyst a catalyst selected from the group consisting of (a) sulfided neodymium-nickel-tungsten-boria-alumina and (b) sulfided neodymium-nickel-molybdenum-silica-alumina wherein said neodymium is present in an amount in the range of about 1 to 10 weight percent, said composition (a) being formed by the sulfiding of a previously calcined mixture of salts of neodymium, nickel and tungsten deposited on a boria-alumina support, and said composition (b) being formed by the sulfiding of a previously calcined mixture of salts of neodymium, nickel and molybdenum deposited on a silica-alumina support.

5. A process according to claim 4 wherein the catalyst is sulfided neodymium-nickel-tungsten-boria-alumina.

6. A process according to claim 4 wherein the catalyst is sulfided neodymium-nickel-molybdenum-silica-alumina.

References Cited

UNITED STATES PATENTS

| 2,337,191 | 12/1943 | Greensfelder | 260—668 |
| 3,291,751 | 12/1966 | Buss | 252—439 |
| 3,238,147 | 3/1966 | Cramer | 252—453 |
| 3,280,040 | 10/1966 | Jaffe | 252—439 |
| 3,269,958 | 8/1966 | Gatsis | 252—439 |
| 3,173,854 | 3/1965 | Eastwood | 208—111 |

PATRICK P. GARVIN, Primary Examiner

U.S. Cl. X.R.

208—112; 252—432, 439